United States Patent
Campo

[15] 3,675,776
[45] July 11, 1972

[54] FILTER DEVICE

[72] Inventor: Philip Campo, 202-14 33rd Avenue, Queens County, N.Y. 11361

[22] Filed: Dec. 16, 1970

[21] Appl. No.: 98,815

[52] U.S. Cl. ..............................210/232, 210/282, 210/451, 210/455, 210/484, 210/489
[51] Int. Cl. .......................................................B01d 27/00
[58] Field of Search..................210/282, 450, 451, 455, 477, 210/479, 484, 264, 290, 291, 452

[56] References Cited

UNITED STATES PATENTS

| | | | |
|---|---|---|---|
| 1,430,234 | 9/1922 | Keithline | 210/451 |
| 1,274,940 | 8/1918 | Sage | 210/452 |
| 2,625,273 | 1/1953 | Schuller | 210/452 X |
| 3,182,803 | 5/1965 | Chisholm | 210/282 X |
| 3,357,563 | 12/1967 | Sicard | 210/282 X |
| 2,801,008 | 7/1957 | Schmid | 210/452 X |

*Primary Examiner*—Reuben Friedman
*Assistant Examiner*—Frederick F. Calvetti
*Attorney*—Natter, Wigman & Natter

[57] ABSTRACT

A fluid purification filter device which includes a filter casing for accommodating a disposable filter element. The filter casing is provided with a fluid impervious barrier which divides the interior thereof into at least two compartments. The filter element is symmetrically shaped, and is insertable from either end, into the filter casing and interlockingly engaged with the barrier, such that distinct portions of the filter element extend into each of the compartments and the resultant channelized flow is caused to pass through the several distinct portions of the filter element. A modified embodiment has an independent replacement filter cartridge insertable into the filter element.

10 Claims, 7 Drawing Figures

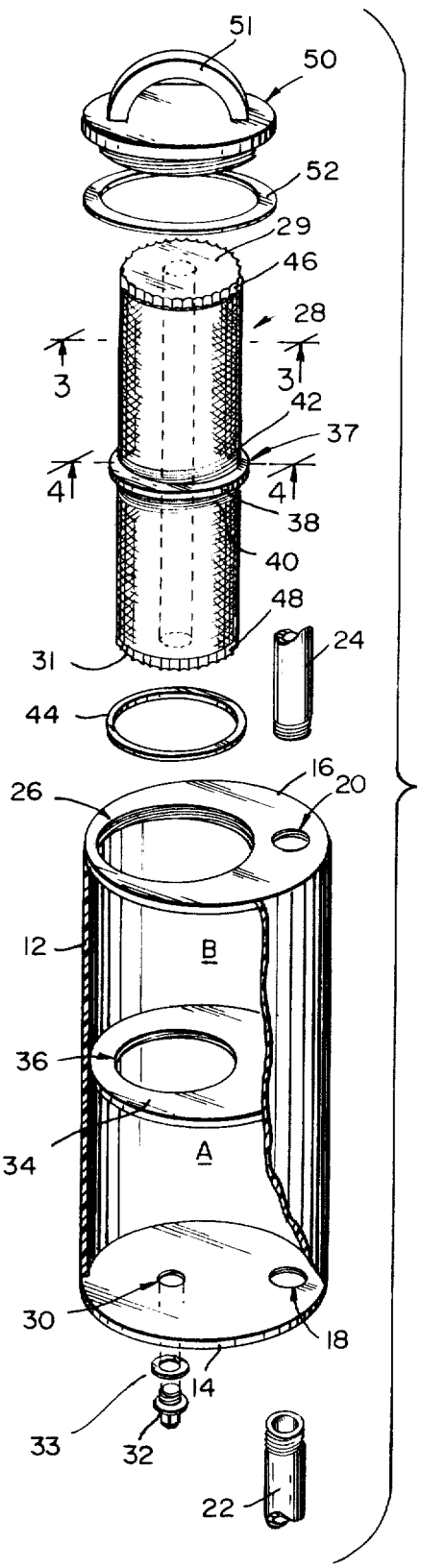
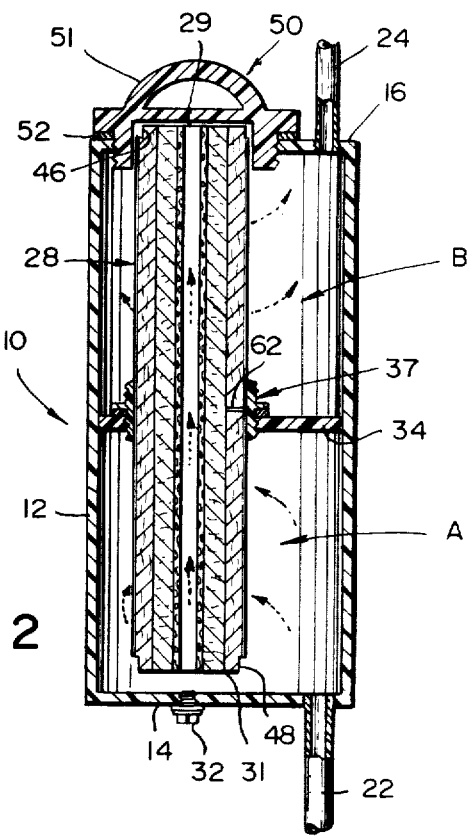
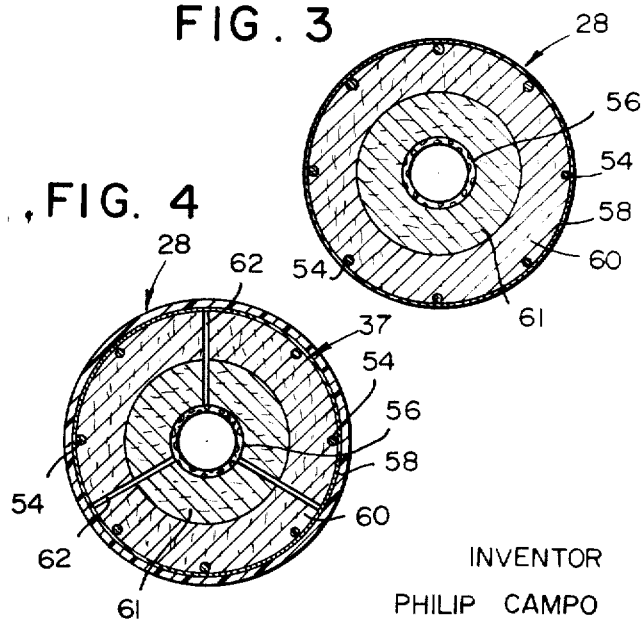
INVENTOR
PHILIP CAMPO

INVENTOR.
PHILIP CAMPO
BY
Nutter, Wigman & Nutter
ATTORNEYS

FILTER DEVICE

BACKGROUND OF THE INVENTION

This invention relates to fluid purification apparatus and especially to a fluid or water filter device having a replaceable filter element removably insertable within a filter housing or casing.

The ever increasing interest in ecology has drawn frequent attention to various environmental conditions including the growing concern over the gradual deterioration of, and present problems affecting pollution to public water supplies. Ground water, streams, lakes and rivers are often found to have dangerously high levels of chemical wastes, e.g., mercury, detergents containing phosphates and pesticides such as DDT. In many instances, and until water sources are free of these pollutants, a current and sometimes critical need exists for improved means to remove contaminating substances and impurities from water used daily for drinking, cooking, washing, etc. The water treatment and filtration plants in many cases are not designed to, or otherwise prove unsatisfactory for completely removing an eliminating some foreign substances, especially at the point of ultimate usage and consequently water for consumption is frequently found to have unpleasant tastes, odors, gases, murkiness, objectionable color, chemical substances causing "hard" water, toxic chemicals, etc.

These and other impurities constitute an annoyance, inconvenience and potential health problem to water users, and in many instances, add hidden costs in the nature of plumbing repairs resulting from scale deposited in water pipes, hot water boilers and steam heaters.

It should therefore be apparent that there is need for an economical filter device which would eliminate some or all of these objectionable characteristics. The filter device of this invention is especially suited for these purposes and incorporates a removable and/or disposable filter element which can easily be replaced when no longer effective. The filter element can be designed for the selective removal of one or more impurities and several such filter elements may be interchangeably employed in the same filter casing.

This invention further provides a filter device which can easily and conveniently be installed in most commonly used water systems, and is adapted for applications in homes, apartments, etc.

Many of the conventional filter apparatus employ filter elements wherein flow therethrough is generally in a radially inward direction and passes axially outward or the converse thereof. This flow pattern however achieves only a single filtering action. The instant filter device in contrast to the prior art, is designed for more effective filtering and accomplishes this by directing the fluid flow through several distinct portions of the same filter element. Furthermore, the filter element is symmetrically shaped and may be removed and replaced or reinserted in the filter casing in a reversed orientation to thus increase the maximum effective usefulness of the filter element.

SUMMARY OF THE INVENTION

The filter device is comprised of a housing or filter casing for containing a filter element. The filter casing includes an interior partition or wall forming a fluid impervious barrier. The filter element is adapted to be releasably secured to the barrier and may be removed, reinserted or replaced when necessary. The impervious barrier also separates the interior of the filter casing so that the fluid flow is channelized or directed through the filter element at least twice prior to exiting from the filter casing, thus effectuating an improved plural filtering action.

A feature therefore of the instant invention is the fact that the filter apparatus achieves at least a double filtering action with a single filter element.

Another advantage of this invention resides in the symmetrical design of the filter element which permits maximum usage and increased effective life.

In an alternate embodiment, the filter element is designed to accommodate a separably insertable filter cartridge. This filter cartridge provides an economical and convenient means for replacing the filter material within the filter element without the necessity of replacing the entire filter element.

An object therefore of this invention is to provide a filter device having these distinct advantages over the prior art filter apparatus.

It is a further object of this invention to provide a filter device having locking means adapted to releasably secure a removable and/or replaceable filter element.

A still further object of this invention is to provide a filter device wherein a symmetrically shaped filter element may be releasably secured in either of two orientations.

Another object of this invention is to provide a filter device having an impervious barrier defining at least two compartments within the filter casing wherein the fluid flow therethrough passes through distinct portions of the filter element extending in each of the compartments.

Still another object of this invention is to provide a filter device wherein a replacement filter cartridge is insertable within the filter element.

BRIEF DESCRIPTION OF THE DRAWINGS

In the accompanying drawings in which are shown some of the various embodiments of the invention:

FIG. 1 is an exploded view in perspective, showing a filter casing, filter element and cap member, with a portion of the filter casing broken away to expose an impervious barrier;

FIG. 2 is a longitudinal sectional view of the filter element locked within the filter casing and shows the fluid flow (indicated by arrows) through the filter element and out the filter casing;

FIG. 3 is a sectional view of the filter element taken along line 3—3 of FIG. 1 exposing concentric layers of filter material;

FIG. 4 is a sectional view of the filter element taken along line 4—4 of FIG. 1 and showing an externally threaded locking ring member affixed to the filter element;

DETAILED DESCRIPTION OF THE INVENTION

Figure 5:
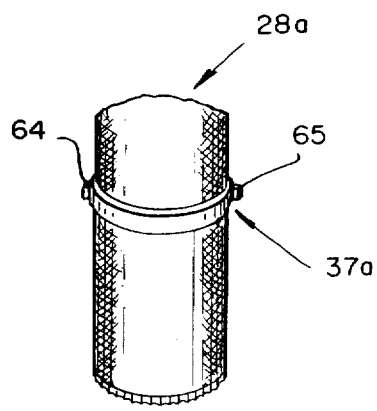
FIG. 5 is a fragmentary perspective view of a modified embodiment of the filter element showing a locking ring member having radial tab projections.

Referring now in detail to the drawings, the reference numeral 10 denotes generally the preferred embodiment of the filter device of this invention. The filter device 10 is comprised of a cylindrical outer housing or filter casing 12 which may be fabricated of any fluid impervious material and preferably is molded from a plastic such as polypropylene. The filter casing 12 is provided with a bottom wall 14 having an internally threaded aperture 18 and a top wall 16 having an internally threaded aperture 20. The apertures 18 and 20 respectively receive an inlet conduit 22 and an outlet conduit 24 which are part of a water supply system. The top wall 16 also has an internally threaded opening 26 which serves as an entrance and exit means through which an elongated cylindrically shaped filter element 28 having opposed ends 29 and 31 may be inserted or removed from the filter casing 12. The bottom wall 14 is additionally provided with a drain opening 30 adapted to be closed by a threaded drain plug 32 having a washer 33.

An interior partition, wall or barrier 34 separates or divides the interior of the filter casing 12 into a plurality of chambers or compartments A and B as illustrated in the preferred embodiment. The barrier 34 is preferably formed integrally with the casing 12 and is also fabricated from a fluid impervious material. An internally threaded opening 36 provided in barrier 34 is adapted for locking engagement with an externally threaded locking ring member 37 affixed to the filter element 28. The locking ring member 37 is provided with a peripheral lip portion 38, and has externally threaded portions 40 and 42 respectively on either side of the lip portion 38. Either of said externally threaded portions 40 or 42 depending on which end 29 or 31 of the filter element 28 is first inserted in the filter casing 12, is engageable within the threaded opening 36 and locked by turning the element 28 relative to the casing 12. A sealing member or gasket 44 is interposed and compressed between the lip portion 38 and the barrier 34 to insure a fluid tight seal when the filter element 28 is fully seated. Finger grip portions or surface roughened bands 46 and 48 are respectively provided around the filter element 28 at the opposed ends 29 and 31. The bands 46 and 48 provide grip means for turning the filter element 28 in the opening 36, and will facilitate the insertion and removal of same from the filter casing 12. It should be noted that for this purpose one of the ends 29 or 31 and the corresponding band 46 or 48 projects outwardly and extends above the top wall 16 of casing 12 when the filter element 28 is fully seated.

An externally threaded cap member 50 is adapted to be secured within aperture 26. The cap member 50 is recessed to accommodate the projecting end 29 or 31 of the filter element 28. A sealing member or gasket 52 is provided between cap member 50 and top wall 16 to insure a fluid tight seal. A handle 51 is attached to the cap member 50 to facilitate its securement and removal from the casing 12. The cap member 50, similar to the casing 12 is preferably fabricated from a fluid impervious material such as plastic.

The construction of the filter element 28 will now be discussed in greater detail with reference to FIGS. 3 and 4. The filter element 28 preferably is symmetrical in shape, having a unitary construction and is provided with an outer skeletal structure comprised of a plurality of vertical spline members 54 arranged circularly around and spaced radially outward from a perforated or porous tubular member 56. An outer covering 58, typically comprised of a pervious, porous or meshlike material such as plastic, is formed integrally with or otherwise attached to the members 54 forming a boundary envelope or shell terminating in fluid impervious closure ends 29 and 31. One or more layers of filter material are concentrically placed or packed between the tubular member 56 and the outer covering 58. Typically, a filter material such as activated carbon or charcoal will be particularly effective for adsorbing organic matter, chlorine, hydrogen sulfide and iron, and can also be used as a dechlorination agent and to remove phenolic tastes and objectionable color from the water. It should be apparent also that other filter materials may be used for specific problems, e.g., zeolite may be used for water softening purposes; these other filter materials may for example be substituted for or selectively used in conjunction with one of the above mentioned. By way of example, two concentric layers of dissimilar filter material 60 and 61 are illustrated in FIGS. 3 and 4.

Figure 7:
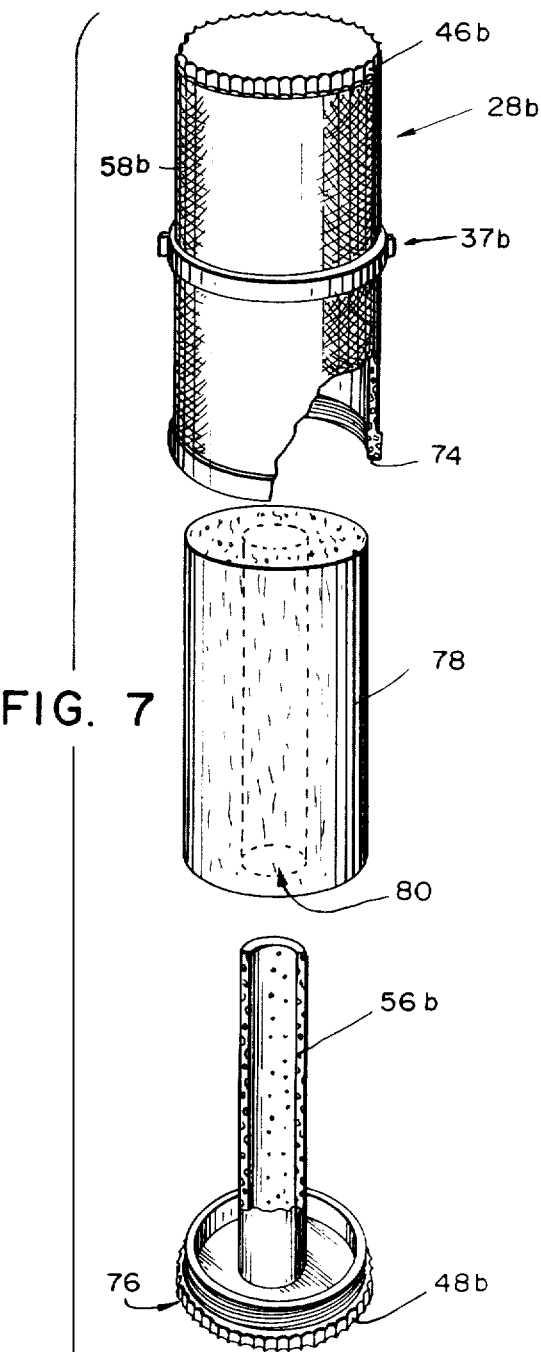
FIG. 7 is an exploded view in perspective of an alternate embodiment of the filter element, wherein one end thereof is adapted to be opened for accommodation of an independent replacement filter cartridge.

An alternate embodiment as shown in FIG. 7 employs a filter material generally compacted or solidified and in the form of an independent filter cartridge.

The locking ring member 37 surrounding the filter element 28 is supported from the tubular member 56 by means of radially extending intermediate spoke members 62. However, the locking ring member 37 may be secured directly to or formed integrally with the shell or outer covering 58 and as so applied in connection with the alternate embodiment illustrated in FIG. 7.

By way of example, the filter element 28 may be approximately four to seven inches in length having a diameter of approximately three to four inches and the filter casing 12 may have a length of approximately 5 to 8 inches and a diameter of approximately 4 to 5 inches. The filter element 28 may be constructed with a tubular member 56 having a diameter of approximately three-quarters to 1 inch. The filter 10 is adapted to accept a fluid from inlet conduit 22 and discharge purified fluid through outlet conduit 24. These conduits 22 and 24 are usually approximately one-half inch to three-quarters inch brass pipe or tubing. The aforementioned dimensions may of course be altered or changed in accordance with the requirements of the particular filter system. However, these sizes are considered most practical for the majority of household applications.

In operation, the fluid or water is designed to flow through the filter casing 12 and to be channelized as indicated by the arrows in FIG. 2 such that the fluid entering through conduit 22 into chamber A passes radially inward through filter element 28, axially upward through the tubular member 56 and is filtered for a second time by the radially outward flow into chamber B from which it eventually exits through the outlet conduit 24. The distinct portion of the filter element 28 which extends in the chamber A will be exposed initially in the filtering operation and hence has a tendency, depending of course on the filter material used, to become saturated or ineffectual as a filtering medium prior to the other distinct portion of the filter element extending in chamber B through which already partially filtered fluid passes.

The filter element 28 is designed to be removed and reinserted in a reverse orientation such that the portion of the filter element in chamber A is now deposed in chamber B. This will effect a reverse flow tending to "wash" out trapped particles, which are removed by allowing the water to run out of an open tap or faucet for a period of time. Furthermore, in some instances, the purification process involves solely a chemical reaction between certain of the chemicals in the water and filter material; in this case the chemical effectiveness of the portion of the filter element 28 in chamber A diminishes before that portion in chamber B; hence this unexhausted portion can now be placed in the chamber A to thus extend the effective maximum duration of filter element usage.

It is important to note that although the tubular member 56 terminates in respective impervious opposed ends 29 and 31, a registered opening may be provided through the end 29 or 31 to permit some axial flow through member 56; this will alleviate the tendency for fluid pressure buildup in chamber A.

Figure 6:
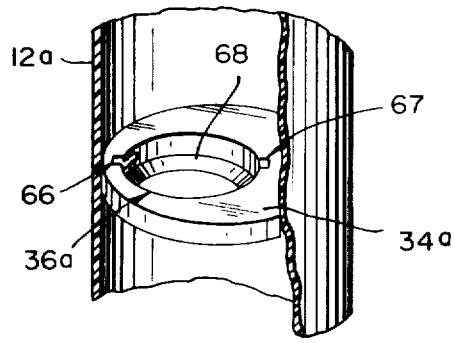
FIG. 6 is a fragmentary perspective view of the interior impervious barrier with an aperture having slotted passageways for receiving the tab projections on the ring member.

In a modified embodiment as illustrated in FIGS. 5 and 6, an alternate locking arrangement is shown wherein filter element 28a is provided with a locking ring member 37a having tab projections 64 and 65 adapted to be lockingly engaged within slots 66 and 67 provided around aperture 36a in barrier member 34a. When the filter element 28a is rotated relative to the casing 12a, the tab projections 64 and 65 become locked within the respective slots 66 and 67. A permanent seal member 68, which may be made of a resilient rubber, plastic or like material, is attached around aperture 36a and is fashioned to surround and contact the filter element 28a when it is in the interlocked position. The modified locking arranGement as just described is adapted to accept the filter element 28a in either of two orientations, that is, it may be removed and reinserted from the opposite end, as previously described with respect to filter element 28.

An alternate embodiment shown in FIG. 7 is directed to a modified construction of a filter element 28b. The modified filter element 28b is comprised of an outer enveloping porous covering 58b surrounding a skeletal framework, similar to that previously described with reference to FIGS. 1–4. A locking ring 37b is formed integrally with or affixed to the covering 58b and finger grip means in the form of bands 46b and 48b are also employed. However, rather than being a unitary, one-piece element, this modified form has means for the replacement of the filtering medium without disposing of the entire filter element. For this purpose, the covering 58b at one end terminates at a circular collar member 74, thereby defining an opening through which a separate filter cartridge 78 may be slidably inserted or removed. The filter cartridge 78 is comprised of compacted, crystalized, granulated or otherwise solidified mass for easy handling. A central hollow core 80 is adapted to accommodate a porous tubular member 56b attached to a cover 76 and will facilitate placement and removal of the cartridge 78. The cover 76 is provided with the band 48b and additionally has a threaded portion for engagement with collar 74.

This modification will allow for the filter cartridge 78 to be removed and replaced without disposing of the entire filter element.

Although this filter device 10 was disclosed with particular reference to water purification purposes, it should be apparent that this device will be useful for filtering many diverse fluids and that specific filtering mediums may be inserted having material specially suited for the removal of particular impurities.

It should be noted that the above cited embodiments are therefore intended as exemplary, and while they have described the invention with specific implementation thereof, other modifications and changes might be made in the embodiment as so set forth and will be apparent to those skilled in the art.

Furthermore, it should be understood that all material shown and described in the accompanying drawings is to be interpreted as illustrative and not in a limiting sense.

Having thus described the invention, there is claimed as new and desired to be secured by Letters Patent:

1. A fluid filter device adapted for installation in a fluid conduit and comprising a casing having an inlet for admitting the fluid flowing through said conduit, and an outlet for discharging the fluid, a replaceable filter element housed within said casing for treating the fluid, a partition wall traversing the interior of the casing intermediate the inlet and outlet opening, said partition wall forming at least two compartments within said casing and further defining an aperture therethrough for receiving the filter element, releasable locking means on said filter element adapted for cooperative engagement with the aperture to form a fluid tight seal and to removably secure the filter element with a portion thereof in each of said compartments and with one end extending beyond the periphery of said casing, closure means for sealing said casing, said filter element defining an internal axial passageway extending longitudinally therethrough for providing fluid communication between said compartments and a filtering medium positioned concentrically around the axial passageway whereby fluid flowing through said casing is directed sequentially into one of said compartments, radially inward through the filtering medium, longitudinally through said passageway into another of said compartments, and radially outwardly through the filtering medium to thus achieve a plural filtering action.

2. A fluid filter device as claimed in claim 1 wherein the locking means secures the filter element in a spaced relationship from the casing with one end of the filter element projecting through an access opening defined in the casing, and said closure means adapted fro accommodating said end of the filter element and for sealing the access opening.

3. A fluid filter device as claimed in claim 2 wherein the locking means includes a ring member spaced from opposite ends of the filter element and provided with a threaded portion thereon for engagement with the aperture.

4. A fluid filter device as claimed in claim 2 wherein the locking means includes a ring member spaced from opposite ends of the filter element and provided with at least one tab projection, and a peripheral slot around said aperture for receiving the tab projection.

5. A fluid filter device as claimed in claim 2 wherein the filter element is symmetrically shaped and further includes gripping means around opposed ends of the filter element thereby permitting insertion into and removal from the casing by either end of the filter element.

6. A fluid filter device as claimed in claim 5 wherein the filter element includes a porous tubular member forming an axial passageway, at least one layer of a filtering medium concentrical with the axial passageway and a liquid pervious boundary material surrounding the filtering medium.

7. A fluid filter device as claimed in claim 2 wherein the filter element is provided with an open end and further including a disposable filter cartridge adapted for accommodation within the filter element through said open end and a cover member for said open end adapted to selectively retain the cartridge within the element.

8. A fluid filter device as claimed in claim 7 wherein the filter cartridge is comprised of a solidified mass of a filtering medium having a central hollow core forming an axial passageway extending longitudinally through the filter cartridge.

9. A fluid filter device as claimed in claim 8 wherein the cover member is provided with an externally threaded portion and further including a threaded collar member surrounding said open end of the filter element adapted to receive said cover member.

10. A fluid filter device as claimed in claim 9 further including a porous tubular member attached to the cover member and adapted to be slidably accommodated within the central hollow core of the filter cartridge.

* * * * *